United States Patent [19]
Moro

[11] Patent Number: 5,357,348
[45] Date of Patent: Oct. 18, 1994

[54] IMAGE FORMING APPARATUS PRODUCING A COMPOSITE IMAGE OF DOCUMENTS OF DIFFERENT SIZES

[75] Inventor: Akihiro Moro, Kawasaki, Japan

[73] Assignee: Kabushiki Kaisha Toshiba, Kanagawa, Japan

[21] Appl. No.: 34,881

[22] Filed: Mar. 19, 1993

[30] Foreign Application Priority Data

Jun. 29, 1992 [JP] Japan .................... 4-170581

[51] Int. Cl.⁵ ............................ H04N 1/387
[52] U.S. Cl. .................... 358/450; 358/452
[58] Field of Search .................. 358/449–452

[56] References Cited

U.S. PATENT DOCUMENTS

| | | | |
|---|---|---|---|
| 5,051,843 | 9/1991 | Hayashi | 358/450 |
| 5,099,336 | 3/1992 | Moriya | 358/450 |
| 5,144,452 | 9/1992 | Abuyama | 358/450 |
| 5,191,429 | 3/1993 | Rourke | 358/450 |
| 5,191,440 | 3/1993 | Levine | 358/450 |

FOREIGN PATENT DOCUMENTS

0429049A3 5/1991 European Pat. Off.
0450552A2 10/1991 European Pat. Off.
0489173A1 6/1992 European Pat. Off.

*Primary Examiner*—Stephen Brinich
*Attorney, Agent, or Firm*—Limbach & Limbach

[57] ABSTRACT

A copier when its automatic detecting function has determined that it is possible to combine multiple documents, combines the multiple documents into a composite image and copies the image on an output sheet in continuously copying documents of different sizes using an automatic document feeder. The copier detects based on the document size, the reduction rate of the document and the size of an image bearing member whether or not it is possible to combine the reduced images of the following and later documents and copy the resulting image, and contains an image memory for storing the composite image of the documents. In an image forming apparatus, documents of different sizes are checked one by one according to their document size and reduction rate and continuous copying is done in the form of a composite image. An image forming method contains a step of detecting based on the document size, the reduction rate of the document, and the size of an image bearing member whether or not it is possible to combine the reduced images of the following and later documents and copy the resulting image, with respect to each document, in copying documents of different sizes automatically. This makes it possible to obtain a suitable composite image according to the size of each document.

9 Claims, 11 Drawing Sheets

| SHEET SIZE IN SUPPLY CASSETTE | SENSING SWITCHES | | | |
|---|---|---|---|---|
| | S3 | S2 | S1 | S0 |
| A 3 | — | — | — | ○ |
| B 4 | — | — | ○ | ○ |
| A 4 - R | ○ | — | — | — |
| B 5 - R | ○ | — | ○ | — |
| A 4 | ○ | — | ○ | ○ |
| B 5 | ○ | ○ | — | ○ |
| A 5 | ○ | ○ | ○ | — |

FIG. 6    ○ : ON

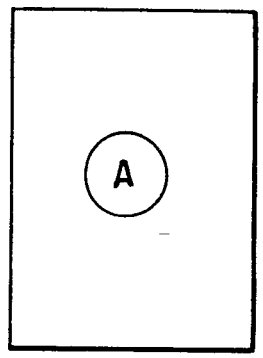
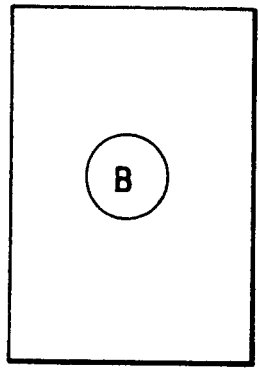
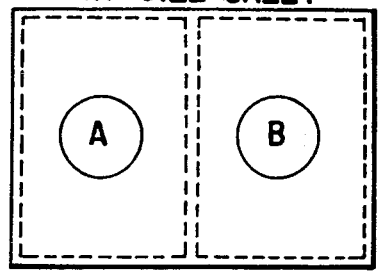
F I G. 10

A3-SIZE SHEET
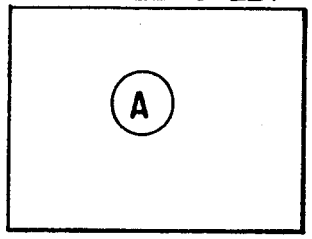
REDUCTION ⇨
A4R-SIZE SHEET
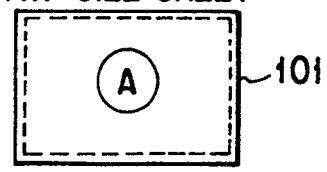
101
A4-SIZE SHEET
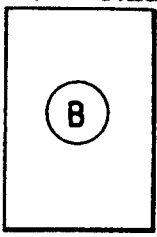
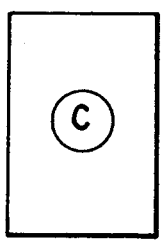
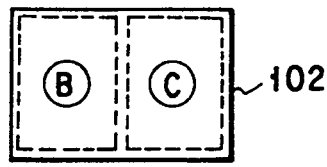
102
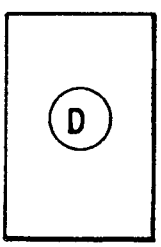
103
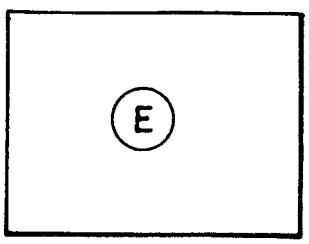
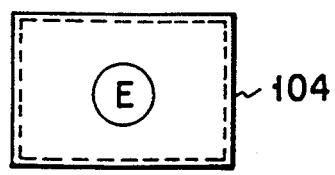
104
F I G. 11

IMAGE FORMING APPARATUS PRODUCING A COMPOSITE IMAGE OF DOCUMENTS OF DIFFERENT SIZES

BACKGROUND OF THE INVENTION

1. Field of the Invention

This invention relates to an image forming apparatus, such as a copier, that reads the image on a document, for example, and forms an image according to the read signal on a sheet of paper.

2. Description of the Related Art

With copiers, an automatic document feeder that feeds documents automatically to a document table for copying is generally used for reproduction of a desired number of copies of a desired size, because it is hard work just to put documents one after another on the document table when a lot of documents have to be copied.

When documents or material of two or more sizes are copied through the automatic document feeder, if documents of large sizes could be copied on a one-document one-output sheet basis and only documents of small sizes copied on a single output sheet, the number of copying sheets used would be decreased.

Once driven with the operation data set, however, conventional automatic document feeders continue a series of processes regardless of document size, so that such a process of scaling down two or more documents only in the case that they are of small sizes so as to pack them into a single copying sheet is not be carried out automatically. Therefore, the operator stops the automatic mechanism, lays out as many sheets of material on the document table as he wants to copy on a single copying sheet, reduces the scale, and finally copies them. As a result, copying documents of two or more sizes so as not to waste output sheets involves troublesome manual operations and longer working hours.

SUMMARY OF THE INVENTION

The object of the present invention is to provide a copier that, when multiple documents can be copied on a single output sheet, lays out and copies the multiple documents on a single output sheet in continuously copying documents of different sizes at a specified reduction rate by means of an automatic document feeder.

An image forming apparatus comprises: means for supplying a plurality of documents consecutively, the documents having a fist document and a second document; first detecting means for detecting a size of the document supplied by the supplying means; means for reading an original image on the document supplied by the supplying means; means for forming the image in accordance with the original image read by the reading means on an image bearing member so that the image is reduced at a predetermined reduction rate; second detecting means for detecting that an area occupied by a first image corresponding to the first document and a second image corresponding to the second document is less than that of the image bearing member, based on the document size detected by the first detecting means, the reduction rate and a size of the image bearing member; and means for combining the first image and the second image so that the first image and the second image are formed on one image bearing member corresponding to the detection of the second detecting means.

With this arrangement, it is possible to copy documents of different sizes continuously in the form of a suitable composite image according to their size and reduction rate. Specifically, with the invention, documents of different sizes are automatically supplied and it is judged from the reduction rate, the document size, and the size of the copying sheet whether or not it is possible to combine multiple documents and copy the resulting composite image. If it is possible, the composite reduced image is stored in the storing means and copied on a copying sheet (an image bearing material). If it is impossible, the image information on the single document is reduced at the set reduction rate and the reduced image is copied on a single copying sheet.

Therefore, even when it is impossible to determine how to combine and output documents of different sizes at the start of continuous copying, the document size detecting function and the combination possibility detecting function of the apparatus enable a suitable image combining process to be performed automatically.

An image forming method comprises: a step of supplying a plurality of documents consecutively, the documents having a first document and a second document; a first detecting step of detecting a size of the document supplied by the supplying means; a step of reading an original image on the document supplied by the supplying means; a step of forming the image in accordance with the original image read by the reading means on an image bearing member so that the image is reduced at a predetermined reduction rate; a second detecting step of detecting that an area occupied by a first image corresponding to the first document and a second image corresponding to the second document is less than that of the image bearing member, based on the document size detected by the first detecting means, the reduction rate and a size of the image bearing member; and a step of combining the first image and the second image so that the first image and the second image are formed on one image bearing member corresponding to the detection of the second detecting means.

Like the image forming apparatus, the image forming method is to detect whether or not it is possible to combine documents of different sizes and copy the composite image on a copying sheet, with respect to each document. Specifically, the document size is detected for each document, and it is detected from the reduction rate and the size of the copying sheet whether or not it is possible to combine the documents. If it is possible, the documents are combined to obtain a composite image. As a result, even when it is impossible to determine how to combine and output documents of different sizes at the start of continuous copying, an optimum composite copying process can be executed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 shows a table used for explaining the relationship between the sheet size for the supply cassette and the sensing switch of the sheet size sensing section of FIG. 3;

FIG. 10 is an explanatory diagram used to explain the relationship between two document images and those printed on an output sheet;

FIG. 11 is an explanatory diagram used to explain the relationship between document images of different sizes and those printed on output sheets;

DETAILED DESCRIPTION OF THE PREFERRED EMBODIMENTS

Referring to the accompanying drawings, an embodiment of the present invention will be explained.

Figure 2:
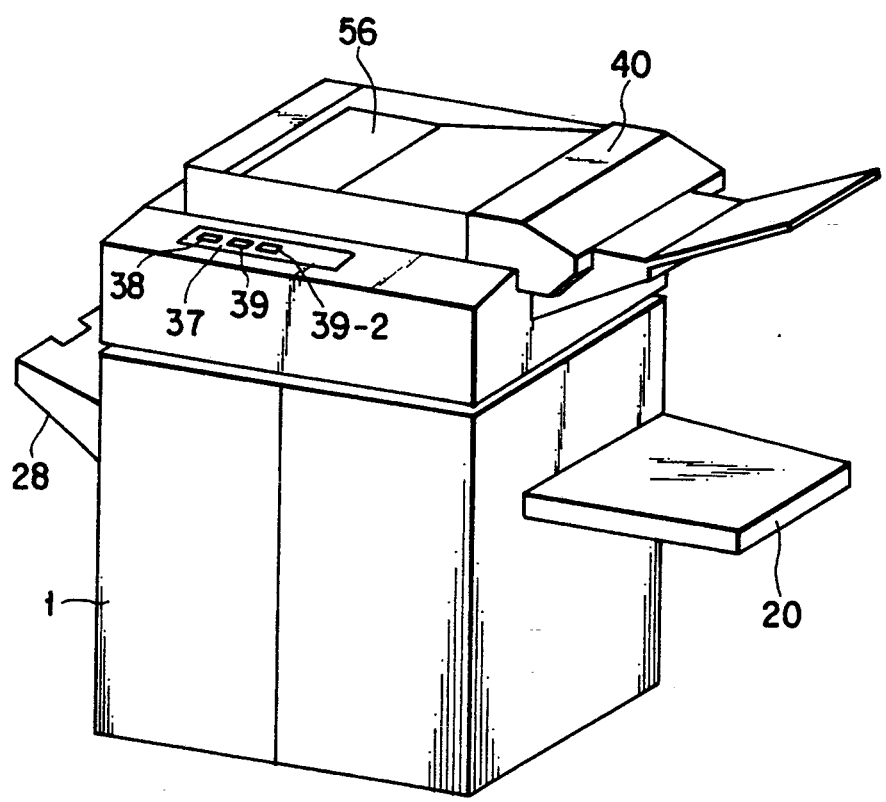
FIG. 2 is an outward view showing the entire construction of the image forming apparatus of FIG. 1.
Figure 3:
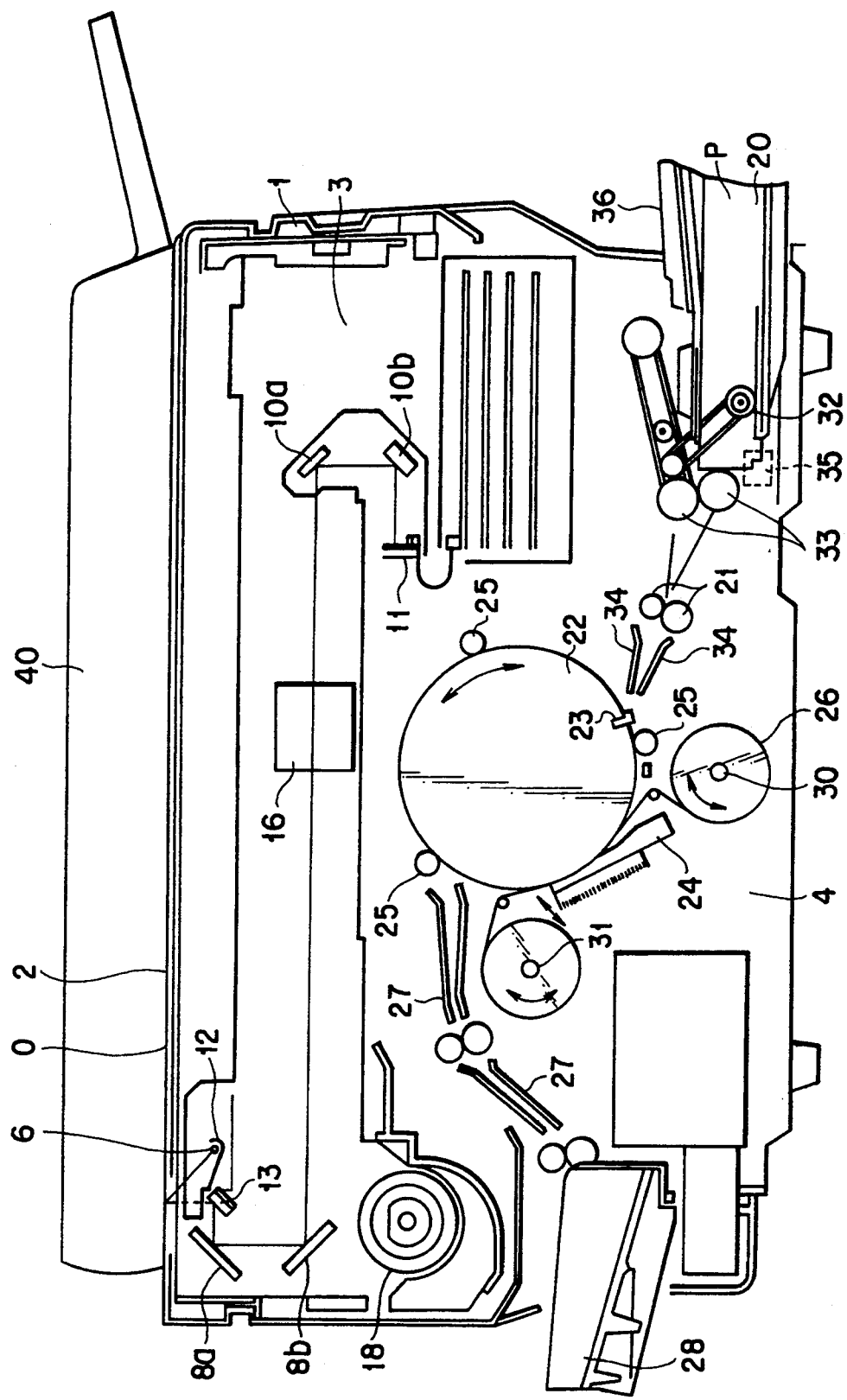
FIG. 3 is a sectional view showing the entire construction of the image forming apparatus of FIG. 1.

FIGS. 2 and 3 show a heat-transfer copier with an automatic document feeder as an example of an image forming apparatus of the present invention;

Specifically, numeral 1 indicates a copier body, on the top of which an automatic document feeder 40 that transports a document O automatically is mounted.

On the top of the copier body 1, a document table (of transparent glass) 2 onto which the document O is fed from the automatic document feeder 40 is provided.

In the copier body 1, there are a document scanning section 3 that scans and reads the document O set on the document table 2 and, in the lower part, an image forming section 4. The document table 2 is secured to the body 1.

Figure 4:
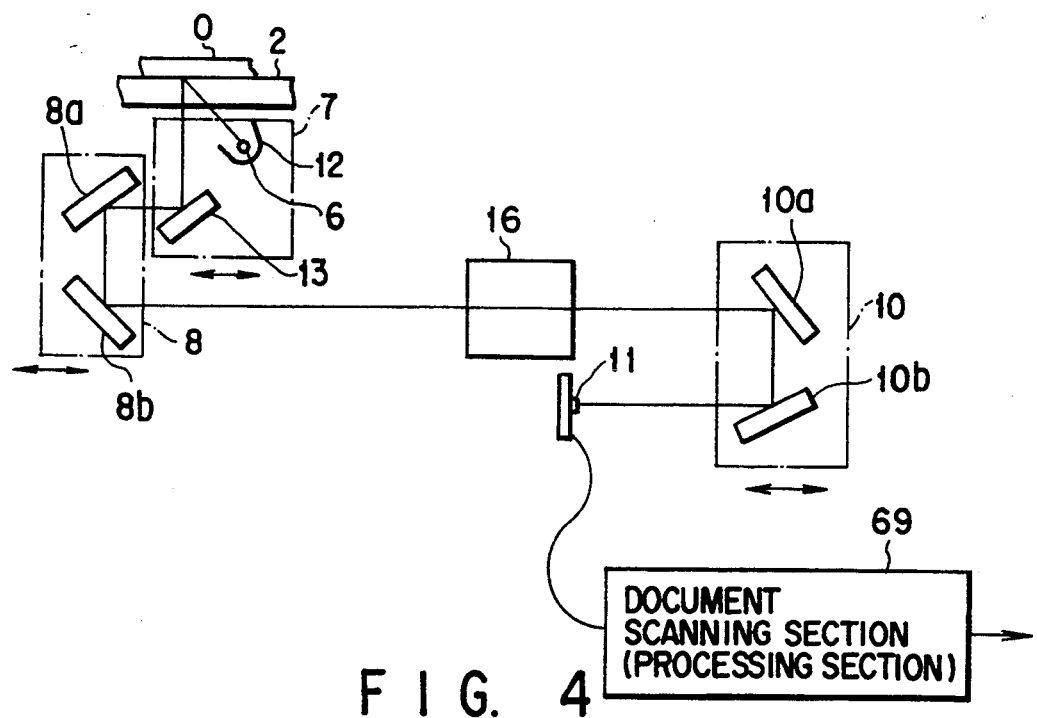
FIG. 4 is a sectional view schematically showing the construction of the document-scanning section of FIG. 3.
Figure 5:
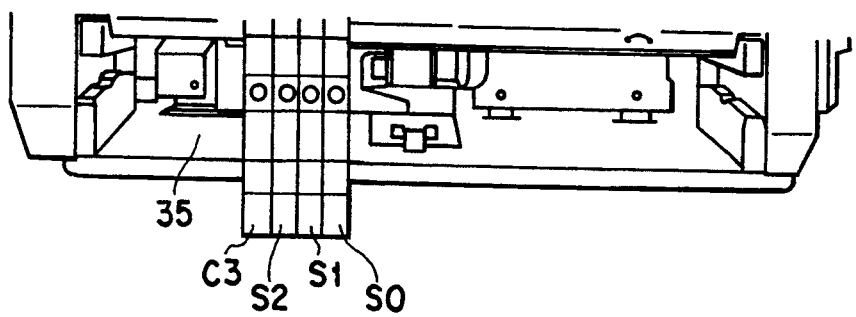
FIG. 5 is a view used for explaining the construction of the sheet size sensing section of FIG. 3.
Figure 7:
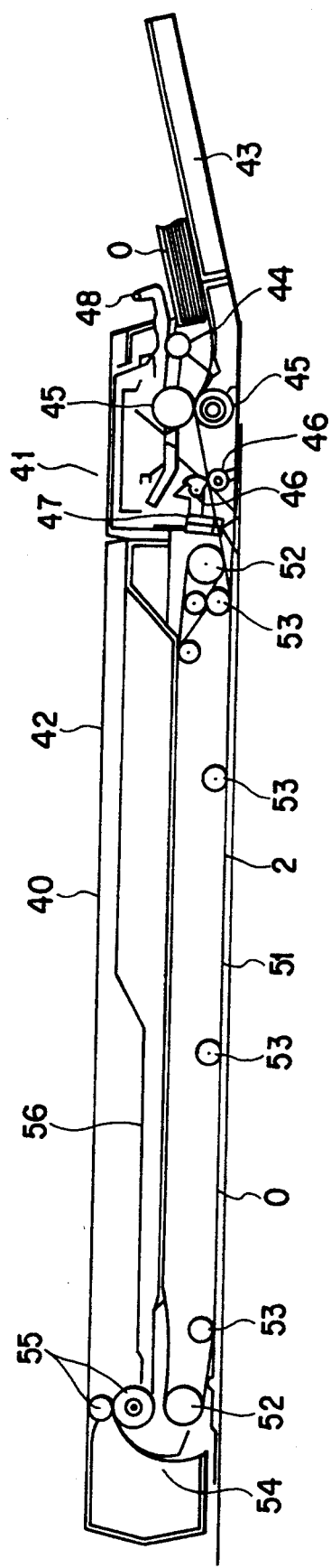
FIG. 7 is a sectional view schematically showing the construction of the automatic document feeder of FIG. 3.

The document scanning section 3 is constructed as shown in FIG. 4, for example. Specifically, it is composed of a first carriage 7 provided with an exposure lamp 6 as a light source, a second carriage 8 that deflects an optical path by means of mirrors, a zoom lens 16, a mirror section 10 that directs the reflected light from the document O to a photoelectric conversion section 11 and corrects the optical path length at the time of varying the power of lens, a photoelectric conversion section 11 that receives the reflected light from the document O, and a driving system (not shown) that changes the position of each section.

The first carriage 7 is provided with the exposure lamp 6 projecting light on the document O, a reflector 12 serving as a reflecting mirror that collects rays of light from the exposure lamp 6 onto the document, and a mirror 13 directing the reflected light from the document O to the second carriage 8.

The second carriage 8 is provided with mirrors 8a and 8B directing the light introduced by the mirror 13 to the zoom lens 16. The first and second carriages 7 and 8 are coupled with each other by means of a timing belt (not shown) so that the second carriage 8 may move in the same direction at half the speed of the first carriage 7. This allows scanning to be done so that the optical path length to the zoom lens 16 may be constant.

The zoom lens 16, whose focal length is fixed, is designed to move along the optical axis at the time of varying its power.

The mirror section 10 is composed of two mirrors 10a and 10b. The position of the mirrors 10a and 10b is changed according to the change of the optical path length according to the variable power selected. By deflecting the optical path of the light from the zoom lens 16 by means of the two mirrors 10a and 10b, the light is directed to the photoelectric conversion section 11.

The photoelectric conversion section 11, which photoelectrically converts the reflected light from the document O, is composed mainly of a CCD line image sensor, for example. Here, a single pixel of the document O corresponds to one element of a CCD sensor. The output of the photoelectric conversion section 11 is supplied to a document scanning section processing section 69, which will be explained later.

The movement of the first and second carriages 7 and 8 and mirrors 10a and 10b is controlled by a stepping motor (a scanning motor) 18.

The first and second carriages 7 and 8 are designed to move according to the movement of a timing belt stretched between a drive pulley (not shown) coupled with the rotating shaft of the stepping motor 18 and an idler pulley (now shown).

The zoom lens 16 is designed to move along the optical axis by the movement of a spiral shaft (not shown), which is rotated by a corresponding stepping motor (not shown).

The image forming section 4 is constructed as shown in FIG. 3, for example. Specifically, a platen drum 22 is provided in the near center of the image forming section 4. The platen drum 22, whose periphery is formed of an elastic material such as rubber, serves as a platen roller for a thermal head 24. The platen drum 22 rotates clockwise to wind a sheet P around itself to hold the sheet P in place in superposed printing. Around the platen drum 22, pressure rollers 25 are provided at regular intervals which prevent the sheet P from floating on the platen drum 22. The circumference of the platen drum 22 is a little larger than the longitudinal length of a sheet of the maximum size.

The thermal head 24, which is located at the lower left of the platen drum 22, is attached to a heat sink integrally formed on the rear end of the holder. Between the platen drum 22 and the thermal head 24, an ink ribbon 26 intervenes as an image forming medium.

Reel hubs 30 and 31 of the ink ribbon 26, which are coupled with the driving shaft of a motor (not shown) via a driving force transmission mechanism (not shown), are rotated as required.

In the lower part of the body 1, a supply roller 32 is provided so as to take out sheets of paper P as image bearing members one by one, which are stored in a supply cassette 20. The sheet P taken out by the supply roller 32 is conveyed by a transport roller 33 to a resist roller 21 provided at the upper left of the transport roller 33, which aligns the leading edge of the sheet. Then, the resist roller 21 transports the sheet via a guide 34 toward the platen drum 22. The sheet is then wound around the platen drum 22 by means of a gripper 23, a pressure roller 25, . . . , for precise paper transport. Here, the supply cassette 20 is detachable from the side of the body 1.

The supply cassette 20 allows a sheet size sensing section 35 to sense the size of the sheet P. The sheet size sensing section 35 is composed of multiple sensing switches (micro switches) that are turned on and off as a cassette of sheets P of a different size is inserted.

For example, the sensing section is made up of four sensing switches S0, S1, S2, and S3. As shown in FIG. 6, when only S0 is turned on, size A3 is sensed; when S0 and S1 are on, size B4 is sensed; when only S3 is on, size A4-R is sensed; when S1 and S3 are on, size B5-R is sensed; when S0, S1, and S3 are on, size A4 is sensed; when S0, S2, and S3 are on, size B5 is sensed; and when S1, S2, and S3 are on, size A5 is sensed.

FIG. 3 shows a manual paper supply unit 36 for manual supply of sheets P. Sheets P supplied from the manual paper supply unit 36 are also wound around the platen drum 22.

A sheet P whose leading edge is fixed in place by the gripper 23 is wound around the platen drum 22 as the drum rotates clockwise. After the edge has passed the printing area, the thermal head 24 is pressed against the platen drum 22 for printing.

After the printing has completed, to discharge the printed sheet, the platen drum 22 is rotated clockwise until the trailing edge of the paper sheet P reaches an outlet guide 27. The instance that the outlet guide is reached, the platen drum 22 is rotated counterclockwise to allow the separating claw (not shown) to separate the trailing edge of the sheet P from the platen drum 22 and the sheet is directed to the paper outlet guide 27. Finally, the leading edge of the paper sheet P is released from the gripper 23 and the copied sheet P transported over the outlet guide 27 is discharged onto an outlet tray 28.

As shown in FIG. 2, at the front of the body 1, an operator panel section 37 is provided. The operator panel 37 is provided with a copy key 38 used to instruct a copy start, a reduction rate setting section 39 used to set a reduction rate, a composite mode switch 39-2, and others.

The automatic document feeder 40 is composed of a take-in section 1 that takes in a document O and a transport section 32 that transports a document O.

The take-in section 41 contains a tray 43 on which a document O is placed, a take-in roller 44 that takes in the document O on the tray 43, a pair of feed rollers 45 and 46, and a sensor 47 that senses the placement of a document O on the tray 43 and the passage of the document O and then produces a sense signal corresponding to the length of the document O. The sensor 47 is a known sensor that senses the placement of a document O on the tray 43 and the passage of the document O. On the top of the tray 43, a sensor 43 is provided which senses whether or not the tray is filled to capacity with documents O to be inserted.

The transport section 42 contains an endless belt 51 serving as document transport means, rollers 52, 52 over which the belt 51 is stretched, rollers 53, 53, 53, 53 that press the belt 51 against the top surface of the document table 2, a transport guide 54 that guides the document O conveyed by the belt 51 upward, and a pair of outlet rollers 55 that discharges the document O conveyed over the transport guide 54.

An paper outlet section 56 that accepts discharged documents 0 is provided on the automatic document feeder 40.

With this arrangement, a document O put on the tray is taken in by the take-in roller 44 into the take-in section 41, and then transported by the feed rollers 45 and 46 to the transport section 42. The document O sent to the transport section 42 is conveyed by the transport belt 51 and stopped at the scanning start position on the document table 2. After the copying is finished, the document O is conveyed by means of the transport belt 51, guide 54, and the outlet roller pair 55 and discharged to the outlet section 56.

Figure 1:
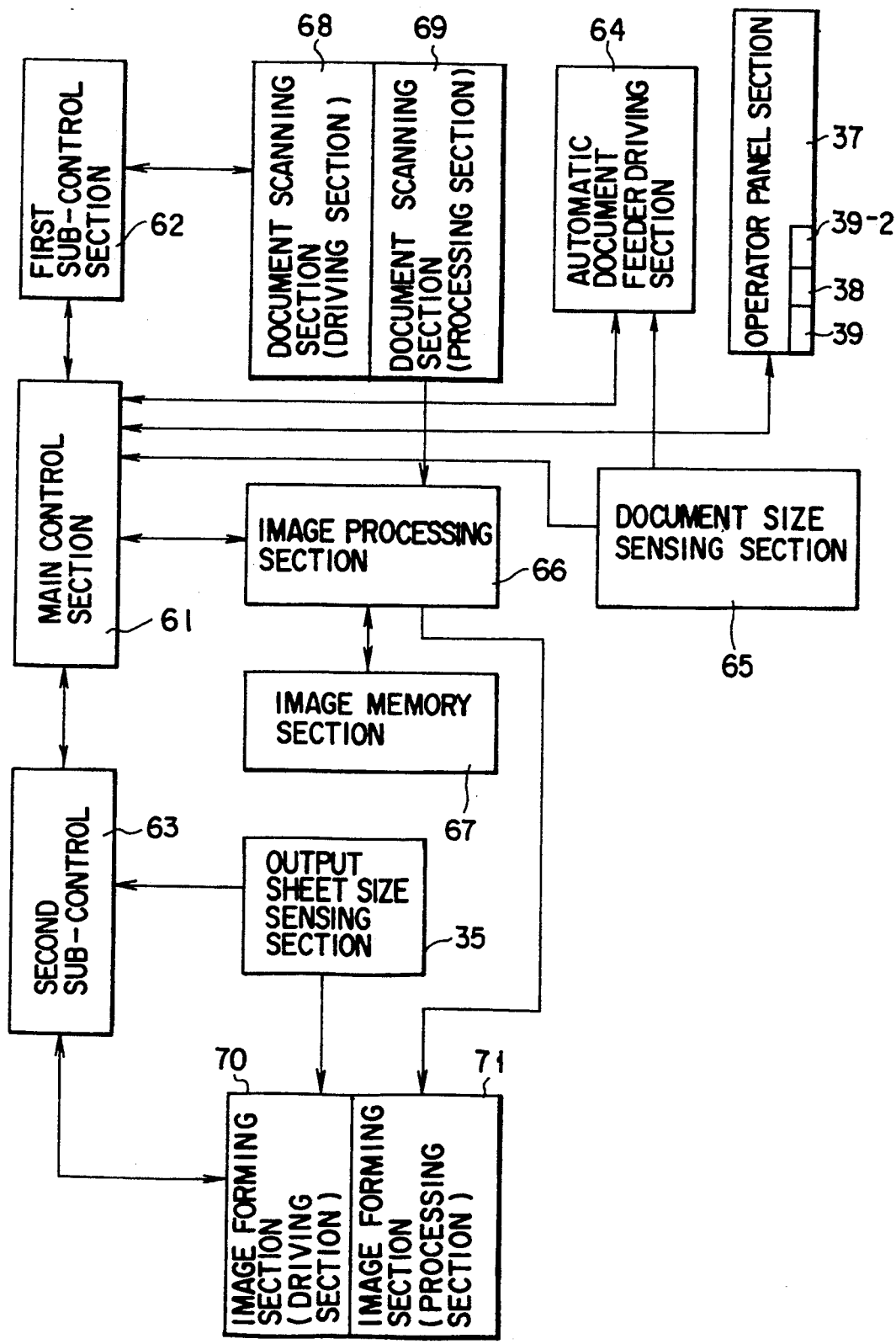
FIG. 1 is a block diagram schematically showing an overall control system of an image forming apparatus according to an embodiment of the present invention.

FIG. 1 schematically shows the entire control system.

In the figure, a main control section 61 is provided which controls the entire image forming apparatus. Connected to the main control section 61 are a first and a second sub-control section 62 and 63 that control each section.

Also connected to the main section 61 are the operator panel section 37, an automatic document feeder driving section 64, a document size sensing section 65, an image processing section 66, and an image memory section 67.

The automatic document feeder driving section 64 drives each roller in the automatic document feeder 40.

The document size sensing section 65, according to the sense signal from the sensor 47, determines the length of a document and, based on this length, senses the size of the document.

The image processing section 66 is a circuit that performs processes, including shading correction, on the image signal supplied from a document scanning section processing section 69 later explained. It supplies the processed image signal to an image forming section processing section 71 and the image memory section 67 under the control of the main control section 61.

The image memory section 67 stores the image signal from the image processing section 66 under the control of the main control section 61. The image signal stored in the image memory section 67 is read and supplied to the image processing section 66. For example, the image memory section 67 is designed to store reduced images of two or more documents.

A document scanning section driving section 68 and a document scanning section processing section 69 are connected to the first sub-control section 62. The document scanning section driving section 68 actuates the illuminating lamp 6 and the scanning motor in the document scanning section 3. The document scanning section processing section 69 performs A/D conversion of an electric signal from the photoelectric conversion section 11 and supplies the resulting signal to the image processing section 66.

An image forming section driving section 70, an image forming section processing section 71, and the sheet size sensing section 35 are connected to the second sub-control section 63.

The image forming section driving section 70 drives the motor and the solenoid in the image forming section 4, depending on the sense result from the sheet size sensing section 35.

The image forming section processing section 71 controls the thermal head 24 according to the image signal supplied from the image processing section 66 to print an image on a sheet P.

With this configuration, explanation will be given as to a case where two documents are scaled down to copy them onto a single sheet.

The reduction rate is first set equal to or less than 70% with the reduction rate setting section 39 of the operator panel section 37. A plurality of documents O are put on the tray 43 and the copy key 38 is pressed. The zoom lens 16 is moved according to the reduction rate at the reduction rate setting section 39.

The size of sheets P in the supply cassette 20 is sensed by the sheet size sensing section 35, and the sense result is supplied to the main control section 61. For instance, the sheet size sensing section 35 supplies size A4-R to the main control section 61.

In this situation, when the copy key 38 is pressed, the main control section 61 checks to see if a document O is placed on the tray 43 and, if it is placed, drives the automatic document feeder driving section 64. This driving allows the document O on the tray 43 to be taken in by the take-in section 41, conveyed by the transport section 42, and placed on the document table 2. In this case, the length of the document is determined from the sense signal from the sensor 47 and, based on the length, the size of the document is sensed, and the sense result is supplied to the main control section 61. For instance, the sense result that the size of the document is size A4 or less is output.

Then, the main control section 61 drives the document scanning section driving section 68 to actuate the illuminating lamp 6 and the scanning motor 18 in the document scanning section 3. This allows the document scanning section processing section 68 to convert a reduced image obtained at the photoelectric conversion section 11 into an electric signal, further perform A/D conversion, and then supplies the resulting signal to the image processing section 66.

The image processing section 66 performs processes, including shading correction, on the image signal supplied from the document scanning section processing section 69, and stores the resulting signal in the image memory section 67.

Next, the main control section 61 actuates the automatic document feeder driving section 64. This driving allows a second document O to be taken in by the take-in section 41, conveyed by the transport section 42, and placed on the document table 2. In this case, the length of the second document is determined from the sense signal from the sensor 47 and, based on this length, the size of the document is sensed, and the sense result is supplied to the main control section 61. For instance, the sense result that the size of the second document is size A4 or less is output.

Then, the main control section 61 drives the document scanning section driving section 68 to actuate the illuminating lamp 6 and the scanning motor 18 in the document scanning section 3. This allows the document scanning section processing section 68 to convert a reduced image obtained at the photoelectric conversion section 11 into an electric signal, further perform A/D conversion, and then supplies the resulting signal to the image processing section 66.

The image processing section 66 performs processes, including shading correction, on the image signal supplied from the document scanning section processing section 69 to obtain an image of the second document.

Then, the main control section 61 combines the image of the first document stored in the image memory section 67 and the image of the second document obtained at the image processing section 66 and supplies the resulting composite image to the image forming section processing section 71.

The image forming section processing section 71 prints on a sheet P the composite image of two documents supplied from the image processing section 66.

Specifically, as shown in FIG. 10, the image of two documents of size A4 transported by the automatic document feeder 40 is printed on a single sheet of size A4.

When no document O is placed on the tray 43 in the automatic document feeder 40, or when the size of a document O placed on the document table 2 by the automatic document feeder 40 is equal to or larger than size A4, the main control section 61 judges that a copying process should be performed on the single document O on the document table 2, and drives the document scanning section driving section 68 to actuate the illuminating lamp 6 and the scanning motor 18 in the document scanning section 3. This allows the document scanning section processing section 68 to convert a reduced image obtained at the photoelectric conversion section 11 into an electric signal, further perform A/D conversion, and then supplies the resulting signal to the image processing section 66.

The image processing section 66 performs processes, including shading correction, on the image signal supplied from the document scanning section processing section 69, and supplies the resulting signal to the image forming section processing section 71.

The image forming section processing section 71 prints the image supplied from the image processing section 66 onto a sheet P.

When the second document is not conveyed by the automatic document feeder 40 but manually placed on the document table 2, or when the size of the document O placed on the document table 2 by the automatic document feeder 40 is size A4 or more, the main control section 61 supplies the image of the first document stored in the image memory section 67 as it is to the image forming section processing section 71.

The image forming section processing section 71 then prints the image supplied from the image processing section 66 onto a sheet P.

Then, the main control section 61 drives the document scanning section driving section 68 to actuate the illuminating lamp 6 and the scanning motor 18 in the document scanning section 3. This allows the document scanning section processing section 68 to convert a reduced image obtained at the photoelectric conversion section 11 into an electric signal, further perform A/D conversion, and then supply the resulting signal to the image processing section 66.

The image processing section 66 performs processes, including shading correction, on the image signal supplied from the document scanning section processing section 69, and supplies the resulting signal to the image forming section processing section 71.

The image forming section processing section 71 then prints the image supplied from the image processing section 66 onto a sheet P.

As explained above, when copying is done in the reduction mode using the automatic document feeder 40, the reduction rate of the first document O is equal to or less than half the size of the output sheet P and when the reduction rate of the next document O is also equal to or less than half the size of the output sheet P, the images of those two documents O are scaled down to print them on a single output sheet P.

Figure 8:
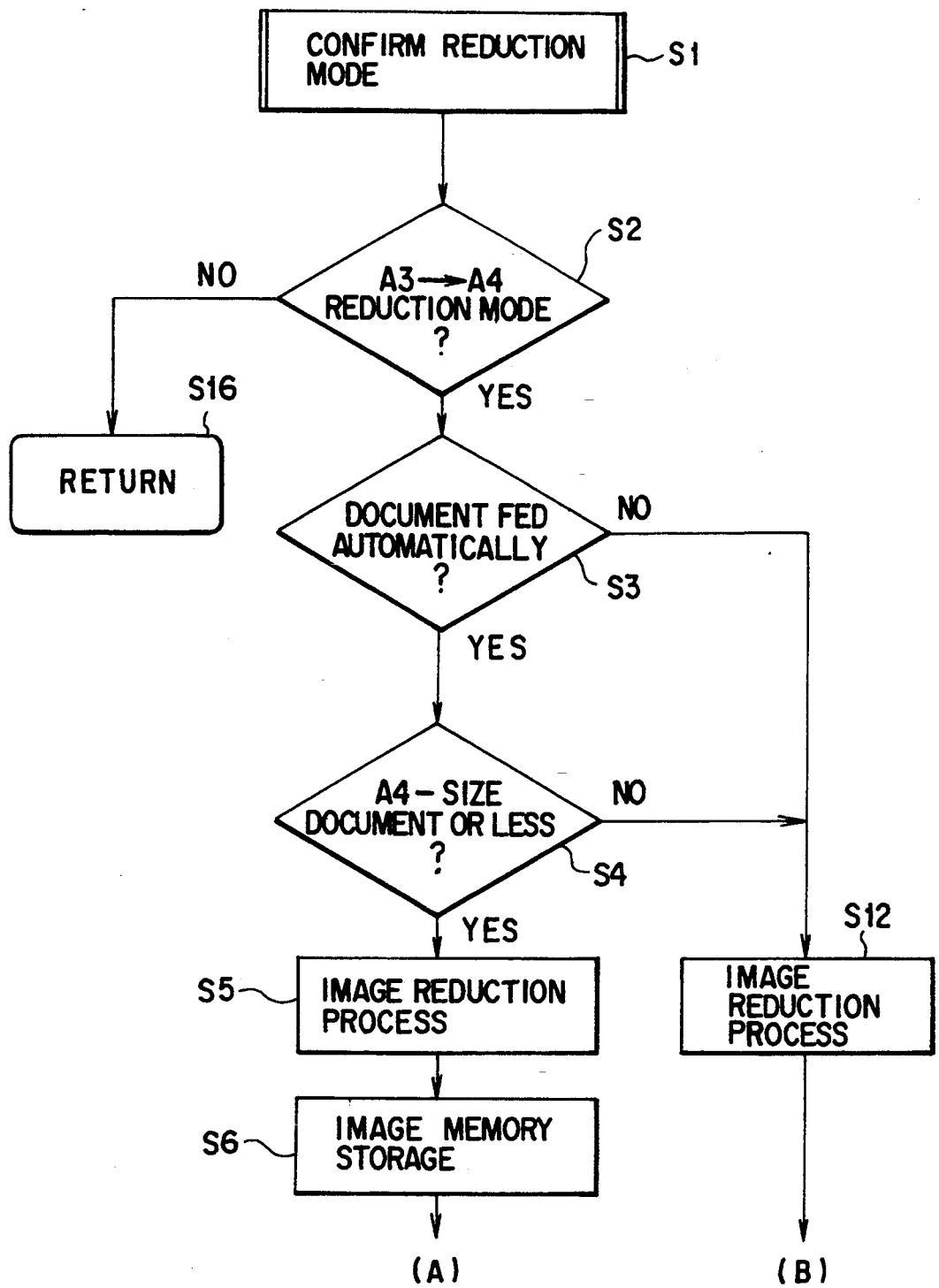
FIGS. 8 and 9 are flowcharts used for explaining the operation of the image forming apparatus of FIG. 1.
Figure 9:
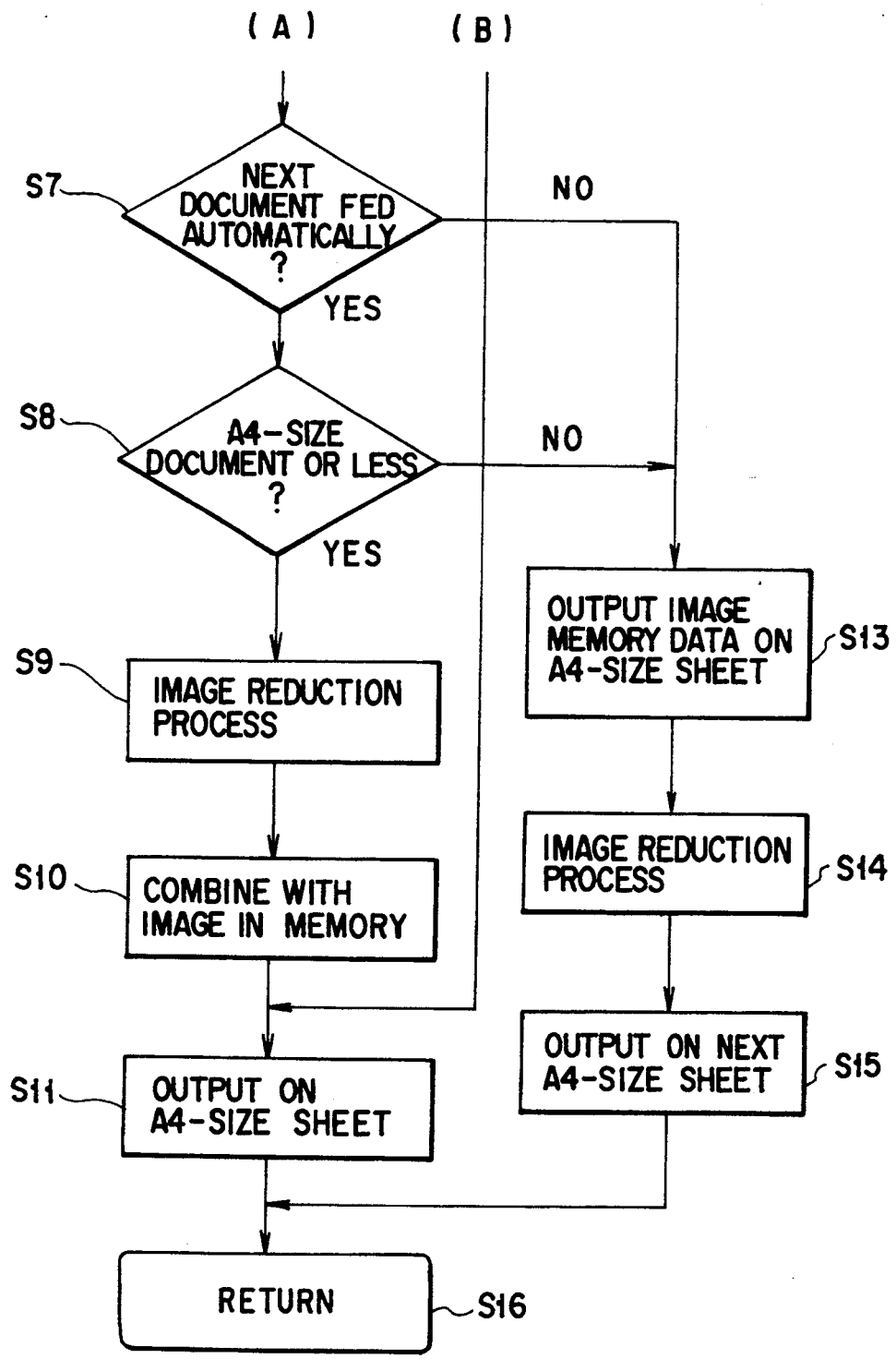

FIGS. 8 and 9 are flowcharts for the above-described processing, centering on the processing at the main control section 61. First, it is confirmed that the reduction mode is on (S1). Then, check is made to see if it is the A3 to A4 reduction mode (S2). If it is not, control returns to step S1. Next, check is made to see if automatic document feeding is used (S3). If it is not, an ordinary reduction process is performed (S12). Then, check is made to see if the document sheet is of size A4 or less (S4). If it is not, control proceeds to the aforesaid reduction process (S12). If it is, an image reduction process is performed on the image information on the document (S5). The image information is then stored in the image memory 67 (S6). Next, check is made to see if a subsequent document is to be transported automatically (S7). If it is not, the image data in the image memory 67 is output on an A4-size sheet (S13), and the next document is scaled down (S14). This reduced document is output on a subsequent A4-size sheet (S15). In this case, of course, the combining of the image information is not done. If a subsequent document is to be transported automatically and is of size A4 or less (S7, S8), the subsequent document is subjected to a reduction process (S9). The resulting reduced image is combined with the preceding reduced image information stored in the image memory 67 (S10). Then, this composite image is output on an A4-size copying sheet (S11). After this operation is completed, control returns to step S1, and a series of the operations described above is repeated (S16).

FIG. 11 is an explanatory diagram used to explain the relationship between document images of different sizes and images printed on output sheets. It can be seen from the figure that the automatic judging function of the present invention realized by the main control section 61 and others, enables consecutive documents A through E of size A3 and size A4 to be suitably combined and copied. Specifically, on a first copying sheet 101, the reduced image of document A of size A3 is output directly; on a second copying sheet 102, the reduced images of documents B and C of size A4 are combined and the resulting composite image is output; and on a copying sheet 103, only the single reduced image of document D of size A4 is output. Here, it can be understood that the control section 61 has judged that the next document E could not fit in the output paper sheet 103 even if combination were done, since document E is of size A3. Then, on the copying sheet 104, only the single reduced image document E of size A3 is output.

With reduced copying by conventional ordinary automatic document feeding, the first copying sheet 101 cannot have a composite image of multiple documents on it as seen on the copying sheet 102. Even with such a type as allows the settings for a composite image, it is impossible to obtain a suitable composite image as shown in the embodiment of the present invention, because the documents are of different sizes including size A3 and size A4.

Figure 12:
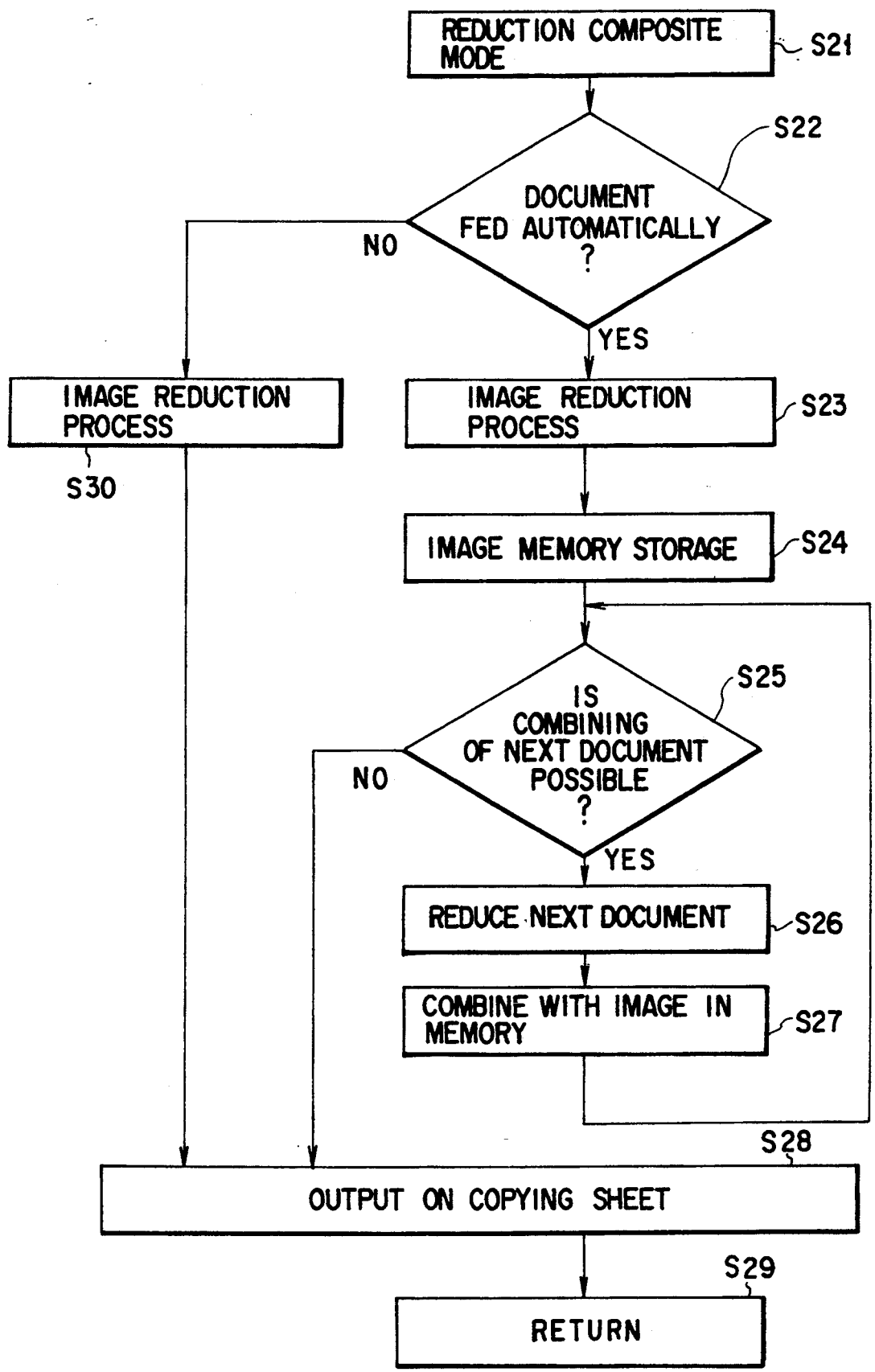
FIG. 12 is a flowchart used to explain the operation of an image forming apparatus of the present invention.

FIG. 12 is a flowchart used to explain the operation of a more general image forming apparatus of the present invention. Another embodiment of the present invention allows the copying of a composite image in various modes, not limited to the automatic composite mode based on the A3 to A4 reduction mode at the time of automatic document feeding. Specifically, with the composite mode specified at the composite mode switch 39-2 of FIG. 1, judgment on each document enables the copying of a suitable composite image on copying sheets of a constant size at a set constant reduction rate, even if documents are of different sizes.

In this flowchart, when the reduction composite mode is selected (S21), it is asked whether the document is to be transported automatically or not (S22). If it is not, the document sheet is subjected to an ordinary image reduction process (S30) and then output on a copying sheet (S28). If it is, an image reduction process is performed on the document (S23), and the reduced image is stored in the image memory section 67 (S24). Next, based on the size of a subsequent document, the reduction rate, the size of a copying sheet, and the size of the reduced image stored in the image memory section 67, it is judge mainly by the main control section 61 whether or not it is possible to combine the reduced image with the image containing the image information on the subsequent document (S25). If it is impossible, the reduced image stored is output on a copying sheet (S28), If it is possible, the image of the subsequent document is scaled down (S26), and the reduced image is also stored in the image memory 67 for formation of a composite image (S27). Then, it is judged again whether or not it is possible to combine the image of a subsequent document with the stored reduced image. The combination is repeated as long as it is possible. When the capacity for the copying sheet of the image memory 67 is full and it is judged that further combination is impossible, the resulting composite image is output on the copying sheet (S28). This action is repeated until the document sheets run out (S29). The present invention is not restricted to the above embodiments, but may be applied to various modifications as long as they provides the effect of the invention. For instance, while in the above flowchart, the automatic document feeding is a requirement for combining images, manual selection of the composite mode may allow documents to be combined until the capacity for the copying sheet of the image memory gets full.

In addition to an automatic start of the composite mode in the A3 to A4 reduction in the automatic document feeding, the automatic composite mode may be achieved in other reductions, including A3 to A4, B4 to B5, A4 to B5, and B4 to A4. In the embodiments, reduction is a requirement for the automatic composite mode. Even if reduction is not required, however, it may be possible to judge whether or not the composite copying of documents of different sizes can be done on a copying sheet and copy the composite image on the sheet as long as the copying sheet has enough space to accept the composite image.

Figure 13:
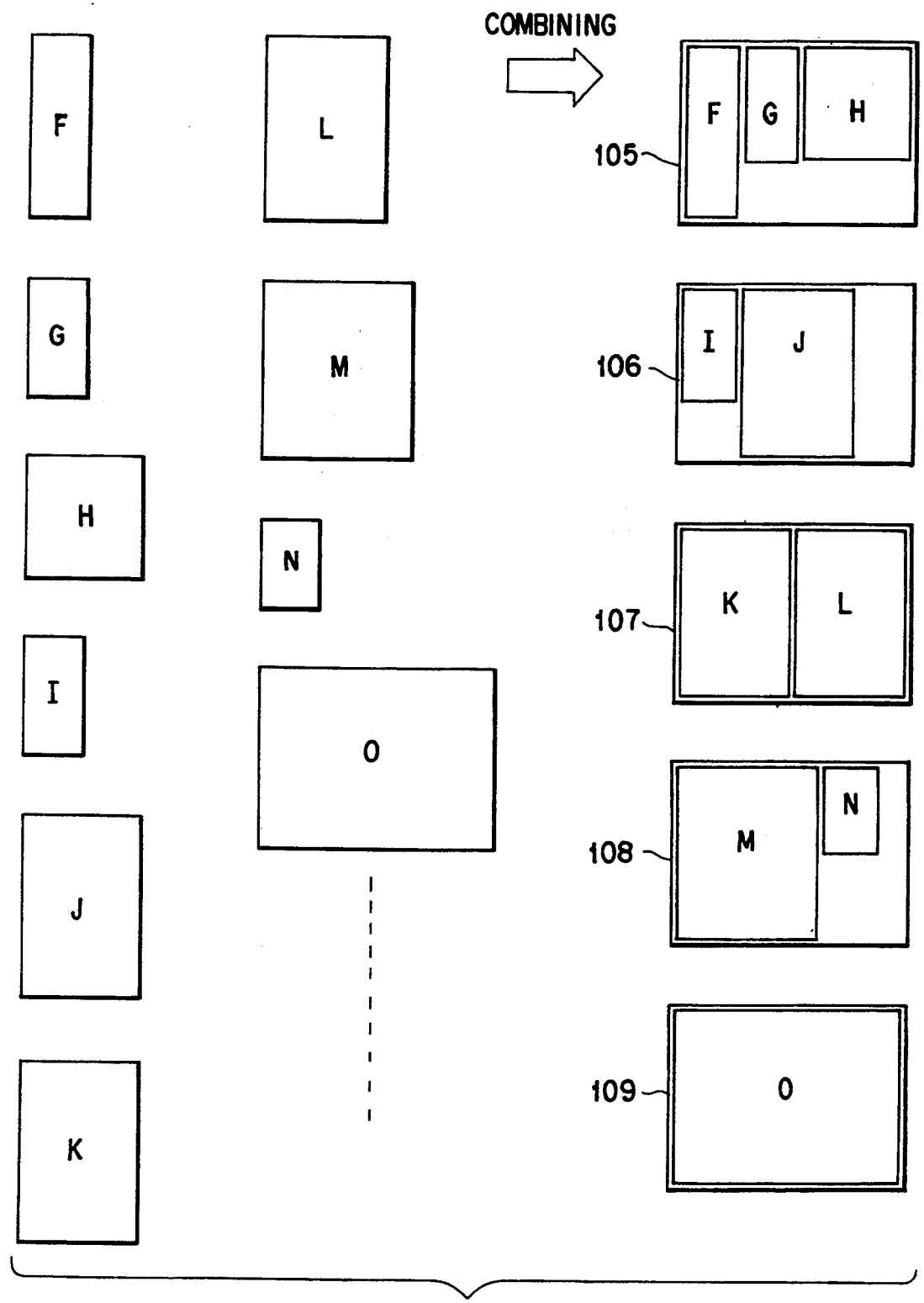
FIG. 13 is an explanatory diagram used to explain the relationship between document images of different sizes and those printed on output sheets.

FIG. 13 is an explanatory diagram for the relationship between images of documents of different sizes and images printed on the output sheet. In the figure, based on the size of copying sheets 105 through 109, a specified reduction rate, and the size of each document, it is judged that composite copying of documents F through O of different sizes is possible, and a process is carried out. On a copying sheet 105, three documents F, G, and H are combined and copied; on a copying sheet 106, documents I and J are combined and copied. Since the next document K cannot be combined with the images on the copying sheet 106, it is combined with document L on a subsequent copying sheet 107. The composite image of documents M and N is copied on a copying sheet 108. Document O is copied on a copying sheet 109.

As described in detail, with a copying apparatus and method of the present invention, documents can be copied in the form of a suitable composite image by judging a possibility of a composite image for each of documents of different sizes, taking into account the reduction rate, the size of copying sheet, and the size of each document. This allows a saving of copying sheets with a simple operation by automatic document feeding. In addition to this, copying can be done on a copying sheet with less wasteful space.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming method comprising the steps of:
   reading a first original image of a first document;
   forming a first reduced image having a first reduced image size by reducing the read image of the first document;
   reading a second original image of a second document;
   forming a second reduced image having a second reduced image size by reducing the read image of the second document;
   comparing a sum of the first and second reduced image sizes to a size of a copying sheet;
   outputting the first reduced image from a memory when the sum of the sizes of the first and second reduced images is larger than the size of the copying sheet; and
   forming the first reduced image on the copying sheet and storing the second reduced image in the memory.

2. The image forming method of claim 1, further comprising the steps of:
   composing the first and second reduced images stored in the memory when the sum of the sizes of the first and second reduced images is smaller than the size of the copying sheet; and
   forming the composed image on the copying sheet.

3. The image forming method of claim 1, further comprising the steps of:
   reading a third original image of a third document;
   forming a third reduced image by reducing the read image of the third document;
   determining a size of the third reduced image;
   comparing a sum of the sizes of the second and third reduced images to the size of the copying sheet;
   outputting the second reduced image from the memory when the sum of the sizes of the second and third reduced images is larger than the size of the copying sheet; and
   forming the second reduced image on the copying sheet and storing the third reduced image in the memory.

4. The image forming method of claim 3, further comprising the steps of:
   composing the second and third reduced images when the sum of the sizes of the second and third reduced images is smaller than the size of the copying sheet; and
   forming the composed image on the copying sheet.

5. An image forming apparatus, comprising:
   means for reading a first original image of a first document and a second original image of a second document;
   means for reducing the read first and second images so as to form first and second reduced images;
   means for determining a size of the first and second reduced images;
   means for comparing a sum of the sizes of the first and second reduced images with a size of a copying sheet;
   means for forming an image of the first and second reduced images on a copying sheet; and
   control means for controlling the image forming means, wherein only the first reduced image is formed on the copying sheet when the sum of the sizes of the first and second reduced images is larger than the size of the copying sheet.

6. The image forming apparatus of claim 5, further comprising:
   storage means for storing the first and second reduced images, wherein the control means controls the image forming means to form only the first reduced image on the copying sheet and controls the storage means to store only the second reduced image when the sum of the sizes of the first and second reduced images is larger than the size of the copying sheet.

7. The image forming apparatus of claim 5, wherein the control means controls the image forming means to compose the first and second reduced images and form the composed image on the copying sheet when the sum of the sizes of the first and second reduced images is smaller than the size of the copying sheet.

8. An image forming apparatus, comprising:
   means for reading a first original image of a first document and a second original image of a second document, and determining a size of the first and second images;
   means for setting a reduction rate for reducing the first and second image read by the reading means, the reduction rate depending upon the sizes of the first and second images;
   means for reducing the first and second images read by the reading means according to the set reduction rate;
   means for determining a size of the first and second reduced images formed by the reduction means; and
   means for forming the first and second reduced images on a copying sheet by composing the first and second reduced images when the sum of the sizes of the first and second reduced images is smaller than a predetermined size.

9. The image forming apparatus of claim 8, wherein the image forming means forms the first and second reduced images on a first and a second copying sheet when the sum of the sizes of the first and second reduced images is larger than the predetermined size.

* * * * *